United States Patent [19]

Araujo

[11] Patent Number: 5,674,790
[45] Date of Patent: Oct. 7, 1997

[54] STRENGTHENING GLASS BY ION EXCHANGE

[75] Inventor: Roger J. Araujo, Horseheads, N.Y.

[73] Assignee: Corning Incorporated, Corning, N.Y.

[21] Appl. No.: 573,087

[22] Filed: Dec. 15, 1995

[51] Int. Cl.[6] ............... C03C 3/04; C03C 3/091; C03C 21/00
[52] U.S. Cl. ............... 501/66; 65/30.14; 501/52; 501/77
[58] Field of Search ............... 65/30.1, 30.13, 65/30.14; 501/52, 66, 68, 69, 73, 77, 153, 154, 900

[56] References Cited

U.S. PATENT DOCUMENTS

| | | | |
|---|---|---|---|
| 3,615,320 | 10/1971 | Junge et al. | 65/30 |
| 3,628,934 | 12/1971 | Duthoit et al. | 65/30 |
| 3,779,732 | 12/1973 | Spanoudis | 65/31 |
| 3,844,754 | 10/1974 | Grubb et al. | 65/30 |
| 4,405,672 | 9/1983 | Araujo et al. | 428/68 |
| 4,818,648 | 4/1989 | Ohta et al. | 430/17 |
| 5,007,948 | 4/1991 | Araujo et al. | 65/30.13 |
| 5,380,596 | 1/1995 | Yoshida et al. | 428/432 |

FOREIGN PATENT DOCUMENTS 3-284706  2/1993  Japan.

*Primary Examiner*—Donald E. Czaja
*Assistant Examiner*—Sean Vincent
*Attorney, Agent, or Firm*—Milton M. Peterson

[57] ABSTRACT

A method of strengthening a glass article by developing compressive stress in a surface layer on the article through an exchange of alkali metal ions in the surface layer at an elevated temperature below the glass strain point, the step of minimizing stress relaxation by carrying out the ion exchange in a glass essentially free from non-bridging oxygen atoms. Glasses having particular utility contain alumina in their compositions in such amount that the number of aluminum atoms in a glass are at least equal to the number of alkali metal ions, or contain both alumina and boric oxide in such amounts that the formula $$\frac{R_2O - Al_2O_3}{B_2O_3} \leq 0.4$$

is satisfied.

15 Claims, No Drawings

STRENGTHENING GLASS BY ION EXCHANGE

FIELD OF THE INVENTION

The field is strengthening of a glass article by exchanging alkali metal ions in the surface of the article at a temperature below the strain point of the glass.

BACKGROUND OF THE INVENTION

Chemical strengthening of glass articles by ion exchange is well documented. The process involves exchange of alkali metal ions from within a surface layer on the article with different alkali metal ions from an external source. The usual practice is to operate at an elevated temperature that is below the glass strain point. In that case, relatively large ions enter the glass and replace smaller ions in the glass by counter diffusion. This develops compressive stress in the ion-exchanged surface layer on the article. In turn, the strength of the article is increased, and, consequently, so is its resistance to fracture.

Early work demonstrated that the rate of ion exchange could be increased by increasing the concentration of alkali metal in the glass composition. However, an increased amount of ion exchange did not always lead to a commensurate increase in strength. This inconsistent behavior was found to be caused by relaxation processes in the glass whereby the larger ions were accommodated in the glass structure. As a result, the stress created by ion exchange was relieved, and the increase in strength lost.

In many glasses, the rate of stress relaxation increases as the concentration of alkali metal oxides in the glass composition increases. Unless some means can be found to prevent stress relaxation, the value of increasing alkali metal oxide concentration in a glass is seriously limited. It is a primary purpose of the present invention to address this problem.

Another facet of the problem arises from the desire to use strengthened glass substrates for deposition of thin films of active materials. For example, electrically conductive, metal oxide films, as well as transistors, may be applied to glass substrates in producing LCD devices. However, the presence of alkali metal ions in a glass substrate causes contamination of such active materials when they are in intimate contact with the glass. The usual mechanism for this contamination is an exchange of alkali metal ions initially in the glass for protons found in almost any material in contact with moisture. It is a further purpose of the invention to solve this problem as well.

One means of avoiding these problems is to use glass substrates that are essentially free of alkali metal oxides. However, the use of such glass substrates precludes the possibility of improving the strength of the substrate by an exchange of alkali metal ions. Such a solution is, therefore, unacceptable.

The present invention is based on my discovery that, by properly selecting compositions for glasses to be strengthened by ion exchange, these purposes can be achieved. I have found that glasses having certain compositions will permit a rapid exchange of ions while undergoing a minimum amount of stress relaxation. I have further found that such glasses also exhibit a minimal tendency to undergo proton-alkali exchange. This minimizes contamination of materials in contact with a substrate.

These discoveries permit rapidly exchanging alkali metal ions to produce articles, such as substrates, that have a high degree of strength. The articles are also adapted to use without danger of alkali contamination of sensitive materials applied thereto.

SUMMARY OF THE INVENTION

One aspect of the invention is a method of strengthening a glass article by developing compressive stress in a surface layer on the article through an exchange of alkali metal ions in the surface layer at an elevated temperature below the glass strain point, the step of minimizing stress relaxation by carrying out the ion exchange in a glass essentially free from non-bridging oxygen atoms.

A further aspect resides in a method of minimizing stress relaxation in a glass article having compressive stress developed by exchange of alkali metal ions in a surface layer on the article which comprises carrying out the ion exchange on a glass essentially free from non-bridging oxygen atoms.

The invention further resides in an ion-exchange strengthened glass article composed of a glass selected from a group consisting of glasses having compositions containing alumina in such amount that the number of aluminum atoms in the glass are at least equal to the number of alkali metal ions in the glass, and glasses having compositions containing both alumina and boric oxide in such amounts that the formula $$\frac{R_2O - Al_2O_3}{B_2O_3} \leq 0.4$$

is satisfied.

PRIOR ART

Prior art of possible interest is described in a separate document.

DESCRIPTION OF THE INVENTION

The present invention is based on discovery of the effects of glass structure on ion exchange. It is particularly based on the effects created by the presence of bridging and non-bridging oxygen atoms in such glass structures.

A bridging oxygen forms a bridge between two atoms which it connects by highly covalent bonds. A non-bridging oxygen does not connect two atoms by covalent bonds. It is connected to only one atom by a covalent bond. Other bonding requirements are fulfilled by ionic bonds.

In pure silica glasses every silicon atom is attached to four different oxygen atoms by bonds that have a high degree of covalency. Each oxygen atom is, in turn, bonded to two silicon atoms. The covalent bonds do not allow appreciable changes in the distances between the silicon and oxygen atoms. Because the oxygen atoms are bonded to two neighboring atoms (silicon atoms in this case) by covalent bonds, they are said to form a bridge and are called bridging oxygen atoms. Each silicon is essentially tied into the glass structure at four points by bonds which are not easily deformed. Therefore, the structure which results is a very rigid structure, and changes in the glass structure caused by stresses occur very slowly.

When alkaline oxides are added to the glass, one non-bridging oxygen is introduced into the structure for every cation of alkali introduced. A non-bridging oxygen atom is bonded to only one silicon atom by a covalent bond. A single negative charge which is localized on such an oxygen atom is compensated by a vicinal alkali ion. The distance between a non-bridging oxygen atom and an alkali ion is changed rather easily. Thus, a silicon atom which is bonded to only three bridging oxygen atoms and to one non-bridging oxygen atoms is essentially tied into the glass structure at three points. In essence, the presence of non-bridging oxygen atoms can be considered to "depolymerize" the glass structure. This causes the structure to be less rigid and causes the rate of any relaxation process to occur more rapidly.

The presence of high field strength ions such as aluminum alters the structure of alkali silicate glasses in that it inhibits the formation of non-bridging oxygen atoms. Aluminum atoms are bonded into the glass by four covalent bonds analogously to silicon atoms. The negative charges required to compensate for the positively charged alkali ions are not localized on single oxygen atoms. They are delocalized over the four oxygen atoms to which the aluminum atom is bonded. The aluminum atoms and its four neighboring oxygen atoms, in essence, constitute an oxyanion analogous to the carbonate or sulfate ions. Thus, the addition of alumina to an alkali silicate decreases the degree of depolymerization of the glass. Consequently, high concentrations of alkali can be included in the glass without substantially increasing relaxation rates if one atom of aluminum is included for every atom of alkali.

The formation of non-bridging oxygen atoms can also be inhibited when the number of alkali metal ions (R) exceeds the number of aluminum ions. However, sufficient boric oxide must be included so that $$\frac{R_2O - Al_2O_3}{B_2O_3} \leq 0.4$$

A slight excess of alkali metal oxide relative to alumina, plus some boric oxide, is desirable. This provides a glass which is melted more easily than one containing equal amounts of alkali and alumina and no boric oxide.

It is well known that a glass containing high concentrations of alkali, particularly high concentrations of lithium, undergoes rapid ion exchange. The value of the present invention resides in part in the discovery that a high strength value, obtained by such rapid exchange, can be retained after such exchange, if non_bridging oxygen atoms are excluded from the system. In other words, stress relaxation is minimal even in glasses containing high concentrations of alkali ions. A further feature of the invention derives from the discovery that boric oxide can be utilized to eliminate non-bridging oxygen atoms without slowing the rate of ion exchange and without adversely influencing the chemical durability of the glass. This requires that the ratio $$\frac{R_2O - Al_2O_3}{B_2O_3} \leq 0.4$$

is satisfied while the concentration of boric oxide does not exceed 15 cation percent. In the absence of $B_2O_3$, the non-bridging oxygens (NBOs) should not be more than 1% of the total oxygens. Another feature resides in the discovery that the avoidance of non-bridging oxygen atoms strongly increases the resistance to alkali metal ion extraction from the glass by a proton-alkali exchange.

For purposes of the invention, it is preferred that compositions of the glasses, as calculated in cationic % on an oxide basis, consist essentially of

| | |
|---|---|
| $SiO_2$ | 35–50% |
| $Al_2O_3$ | 20–28% |
| $B_2O_3$ | 0–10% |
| $Li_2O$ | 8–10% |
| $Na_2O$ | 15–20% |
| $Li_2O + Na_2O$ | 20–30% |

TABLE I sets forth the compositions of several glasses which exemplify the invention. The compositions are presented in cation percent, mol percent and weight percent, as indicated. Compositions 1–6 illustrate the present invention. Compositions 7 and 8 are for comparison glasses having similar components in different amounts

TABLE I

| | 1 | 2 | 3 | 4 | 5 | 6 | 7 | 8 |
|---|---|---|---|---|---|---|---|---|
| Cation % | | | | | | | | |
| $SiO_2$ | 40 | 40 | 45 | 40 | 42.5 | 45 | 48.8 | 50 |
| $Al_2O_3$ | 25.6 | 25 | 22.5 | 25.9 | 27.2 | 27 | 19.8 | 13.1 |
| $ZrO_2$ | — | — | — | — | — | — | — | 2.2 |
| $B_2O_3$ | 6.3 | 7.5 | 7.5 | 6.3 | 2.3 | — | — | — |
| $Li_2O$ | 8.1 | 10 | 10 | 10 | 10 | 10 | 15.1 | 17.8 |
| $Na_2O$ | 20 | 17.5 | 15 | 17.9 | 18 | 18 | 16.2 | 16.8 |
| MgO | — | — | — | — | — | — | 0.9 | — |
| Mol % | | | | | | | | |
| $SiO_2$ | 57.1 | 57.1 | 62.2 | 57.1 | 59.7 | 62.1 | 65.2 | 65.8 |
| $Al_2O_3$ | 18.3 | 17.9 | 14.5 | 18.5 | 19.1 | 18.6 | 12.7 | 8.6 |
| $ZrO_2$ | — | — | — | — | — | — | — | 2.9 |
| $B_2O_3$ | 4.5 | 5.4 | 5.2 | 4.5 | 1.6 | — | — | — |
| $Li_2O$ | 5.8 | 7.1 | 6.8 | 7.1 | 7.0 | 6.7 | 10.1 | 11.7 |
| $Na_2O$ | 14.3 | 12.5 | 10.3 | 12.8 | 12.1 | 2.4 | 10.8 | 11.1 |
| MgO | — | — | — | — | — | — | 0.5 | — |
| Wt. % | | | | | | | | |
| $SiO_2$ | 51.4 | 51.6 | 56.9 | | 53.7 | 56.2 | | |
| $Al_2O_3$ | 28.0 | 27.4 | 24.1 | | 29.2 | 28.6 | | |
| $B_2O_3$ | 4.7 | 5.6 | 5.5 | | 1.7 | — | | |
| $Li_2O$ | 2.6 | 3.2 | 3.1 | | 3.1 | 3.1 | | |
| $Na_2O$ | 13.7 | 11.6 | 9.8 | | 11.7 | 11.6 | | |

Initial development work involved two pound glass melts for screening purposes. For each melt a batch was formulated, mixed and melted overnight at 1500° or 1550° C. in a platinum crucible. The glass melt was poured into molds to provide bars for measurement.

Test bars were subjected to ion exchange from different molten salt baths and at different temperatures. One bath was 100% sodium nitrate while a second was a mixture of 60% potassium nitrate and 40% sodium nitrate. These baths were maintained at either 380° C. or 430° C. for exchange purposes. Exposure times of 4 hours and 16 hours were employed. Because of the large differences in alkali metal ion mobility, the primary ion exchange occurred between sodium ions from the salt bath and lithium ions from the glass.

The test bars were cooled and cleaned after the ion exchange. They were then measured to ascertain the depth of the ion exchanged layer (DOL) in the glass surface. The central tension developed in the unexchanged core of the test bar was also measured.

TABLE II sets forth DOL in microns; CT in psi; and mechanical strength in psi for certain of the glasses of TABLE I.

TABLE II

| Cation % | 1 | 2 | 7 |
|---|---|---|---|
| DOL | 196 | 185 | 225 |
| CT | 2800 | 3300 | 3400 |
| Strength | 66,700 | 68,900 | |

For substrate purposes, it is prescribed that the ion-exchange in a surface layer on a glass substrate be to a depth (DOL) of at least 150 mm. and provide a central tension (CT) in the article of at least 2000 psi. The glasses of the present invention, as well as the comparison glasses, exceed these criteria. However, the much lower lithia ($Li_2O$) content in the present glasses entails a much lower batch cost. Also, the comparison glasses are much harder to melt because they contain more $SiO_2$, no $B_2O_3$ and substantial $ZrO_2$ as compared to the present glasses.

One use of the present glasses is as substrates in articles such as LCD devices. Such use involves deposition of thin films of active material on the substrate. Consequently, k is deskable that alkali metal not be extracted from the glass substrate since it contaminates a film on the surface. Extraction of the alkali metal is possible because water vapor in the air may give rise to a ion exchange of a proton with an alkali metal ion. A direct test of the resistance of a glass to this type of extraction is not practical because the time for such a test is impracticaly long. Therefore, a quicker test has been developed that comprises immersing a sample of glass in a given volume of distilled water for a given time at 95° C. The water is then analyzed to determine the concentration of the various components of the glass which have been extracted. The analysis, of course, measures the total material extracted from the glass by any possible mechanism, and not merely that extracted by the proton-alkali ion exchange.

The usefulness of this test for measuring the potential for alkali metal extraction during the conditions of use of the glass can be understood from the following considerations. If the alkali metal extraction occurred exclusively through an ion exchange process, alkali metal ions would be the only contaminant in the water after the test. If the extraction occurred exclusively through a uniform solution of the glass in the water, all the components would be found in the solution in the same ratios in which they occurred in the glass. If both mechanisms were operative, the relative importance of the two mechanisms could be determined by the comparison of the molar percentages of each contaminant in the solution to that in the original glass. For example, assume all the components of the glass are found in the solution, but the ratio of alkali metal to silica, or the ratio of alkali metal to total material, in the extract are significantly higher than the corresponding ratio found in the glass. Then, one can deduce that the ion exchange mechanism makes a significant contribution to the process of alkali extraction.

TABLE III shows extraction data after 1, 3 and 7 days exposure. The data represents the ratio in percent of total analyzed alkali metal oxide ($M_2O$) to total of all glass components.

TABLE III

| | 1 | 2 | 3 | 4 | 5 | 6 | 7 | 8 |
|---|---|---|---|---|---|---|---|---|
| $M_2O$ % 1 | 24.5 | 20.9 | 19.7 | 20.1 | 25.9 | 28.4 | 33.6 | 66.0 |
| $M_2O$ % 3 | 21.6 | 21.4 | 18.5 | 23.1 | 25.9 | 23.7 | — | 29.7 |
| $M_2O$ % 7 | 22.5 | 21.8 | 18.8 | 22.5 | 22.7 | 22.6 | 21.0 | 24.8 |

The extraction data displayed in the table shows that, for the comparison glass immersed in water for one day, the ratio exceeds by almost a factor of three the ratio in the original glass. This is a clear indication that proton alkali exchange is the dominant mechanism of extraction for short times. After seven days, the extract has the same composition as the original glass, indicating that uniform solution becomes the dominant mechanism of extraction after a sufficiently long period of time. This sequence of processes is quite typical of glasses which contain a high density of non-bridging oxygen atoms. Initially the ion exchange mechanism erodes the durability of the glass and then it dissolves uniformly.

The behavior of the present glasses, which contain no non-bridging oxygen atoms, is distinctly different. The molar ratio of alkali to total extract after one day of immersion is, within experimental error, equal to that in the initial glass. This indicates the absence of any appreciable extraction by the ion exchange process. This deduction is corroborated by the observation that the total mount of alkali extracted in one day is significantly less than that observed in comparison glasses 7 and 8. The extraction data obtained after seven days shows that the total material extracted from the glasses of the instant invention is no less than that extracted from comparison glasses, but this merely indicates that these glasses do not resist uniform solution in hot liquid water any more strongly than do other glasses. However, in use the glasses will not be exposed to liquid water. The important point is that ion exchange of a proton and an alkali ion does not occur so that extraction of alkali from these new glasses by a low level of water vapor in the air is not possible.

I claim:

1. In a method of strengthening a silicate glass article by developing compressive stress in a surface layer on the article through an exchange of alkali metal ions in the surface layer at an elevated temperature below the glass strain point, the step of minimizing stress relaxation by carrying out the ion exchange in the silicate glass containing less than 1% non-bridging oxygen atoms.

2. A method in accordance with claim 1 which comprises carrying out the ion exchange in a member of the $R_2O$—$Al_2O_3$—$SiO_2$ family of glasses in which the number of aluminum atoms in the glass are at least equal to the number of alkali metal atoms in the glass, or in a member of the $R_2O$—$Al_2O_3$—$B_2O_3$—$SiO_2$ family of glasses in which the oxide contents are in such amounts that the formula $$\frac{R_2O - Al_2O_3}{B_2O_3} \leq 0.4$$

is satisfied.

3. A method in accordance with claim 2 wherein the ion exchange is carried out in a $R_2O$—$Al_2O_3$—$SiO_2$ glass containing alumina in its composition in such amount that the number of aluminum atoms in the glass are at least equal to the number of alkali metal atoms in the glass.

4. A method in accordance with claim 2 wherein the glass is an $R_2O$—$Al_2O_3$—$B_2O_3$—$SiO_2$ glass in which the oxide contents are in such amounts that the formula $$\frac{R_2O - Al_2O_3}{B_2O_3} \leq 0.4$$

is satisfied.

5. A method in accordance with claim 4 wherein the boric oxide content does not exceed 15 cation %.

6. A method of minimizing stress relaxation in a silicate glass article having compressive stress developed by exchange of alkali metal ions in a surface layer on the article which comprises carrying out the ion exchange on the silicate glass containing less than 1% non-bridging oxygen atoms.

7. A method of minimizing stress relaxation in accordance with claim 6 which comprises carrying out the ion exchange in a member of the $R_2O$—$Al_2O_3$—$SiO_2$ family of glasses in which the number of aluminum atoms in the glass are at least equal to the number of alkali metal atoms in the glass, or in a member of the $R_2O$—$Al_2O_3$—$B_2O_3$—$SiO_2$ family of glasses in which the oxide contents are in such amounts that the formula $$\frac{R_2O - Al_2O_3}{B_2O_3} \leq 0.4$$

is satisfied.

8. A method of minimizing stress relaxation in accordance with claim 7 wherein the ion exchange is carried out in a $R_2O$—$Al_2O_3$—$SiO_2$ glass containing alumina in its composition in such amount that the number of aluminum atoms in the glass are at least equal to the number of alkali metal atoms in the glass.

9. A method of minimizing stress relaxation in accordance with claim 7 wherein the ion exchange is carried out in a glass wherein the glass is an $R_2O$—$Al_2O_3$—$B_2O_3$—$SiO_2$ glass in which the oxide contents are in such amounts that the formula $$\frac{R_2O - Al_2O_3}{B_2O_3} \leq 0.4$$

is satisfied.

10. A method in accordance with claim 9 wherein the boric oxide content does not exceed 15 cation %.

11. An ion-exchange strengthened silicate glass article composed of a glass selected from a group consisting of $R_2O$—$Al_2O_3$—$SiO_2$ glasses having compositions containing alumina in such amount that the number of aluminum atoms in the glass are at least equal to the number of alkali metal atoms in the glass, and $R_2O$—$Al_2O_3$—$B_2O_3$—$SiO_2$ glasses having compositions containing both alumina and boric oxide in such amounts that the formula $$\frac{R_2O - Al_2O_3}{B_2O_3} \leq 0.4$$

is satisfied, and wherein the non-bridging oxygen content is less than 1% of the total oxygen content.

12. An ion-exchange strengthened glass article in accordance with claim 11 wherein the $R_2O$—$Al_2O_3$—$SiO_2$ glass composition contains alumina in such amount that the number of aluminum atoms in the glass are at least equal to the number of alkali metal atoms in the glass.

13. An ion-exchange strengthened glass article in accordance with claim 11 wherein the $R_2O$—$Al_2O_3$—$B_2O_3$—$SiO_3$ glass composition contains both alumina and boric oxide in such amounts that the formula $$\frac{R_2O - Al_2O_3}{B_2O_3} \leq 0.4$$

is satisfied.

14. An ion-exchange strengthened glass article in accordance with claim 13 wherein the glass composition contains boric oxide in an amount not over 15 cation %.

15. An ion-exchange strengthened silicate glass article in accordance with claim 11 wherein the glass composition consists essentially of, as calculated in cationic % on an oxide basis,

| | |
|---|---|
| $SiO_2$ | 35–50% |
| $Al_2O_3$ | 20–28% |
| $B_2O_3$ | 0–10% |
| $Li_2O$ | 8–10% |
| $Na_2O$ | 15–20% |
| $Li_2O + Na_2O$ | 20–30%. |

* * * * *